United States Patent
Choi et al.

(10) Patent No.: US 9,990,051 B2
(45) Date of Patent: Jun. 5, 2018

(54) PORTABLE KEYBOARD

(71) Applicant: LG ELECTRONICS INC., Seoul (KR)

(72) Inventors: Yunjin Choi, Seoul (KR); Siyoung Park, Seoul (KR); Kwangsoon Jang, Seoul (KR); Hyunwoo Yoo, Seoul (KR); Sooyong Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/401,769

(22) Filed: Jan. 9, 2017

(65) Prior Publication Data
US 2017/0300127 A1  Oct. 19, 2017

Related U.S. Application Data

(63) Continuation of application No. PCT/KR2016/008931, filed on Aug. 12, 2016.
(Continued)

(30) Foreign Application Priority Data

Apr. 25, 2016 (KR) .................. 10-2016-0050196

(51) Int. Cl.
G06F 3/02 (2006.01)
H01H 13/14 (2006.01)
(Continued)

(52) U.S. Cl.
CPC .......... *G06F 3/0221* (2013.01); *G06F 3/0231* (2013.01); *H01H 13/14* (2013.01); *H01H 13/70* (2013.01)

(58) Field of Classification Search
CPC ..... G06F 3/0221; G06F 3/0231; H01H 13/14; H01H 13/70
(Continued)

(56) References Cited

U.S. PATENT DOCUMENTS 7,125,180 B2 * 10/2006 Hsu .................. G06F 3/0221
400/489
2006/0198088 A1 * 9/2006 Anderson ............ G06F 1/1609
361/679.27
(Continued)

FOREIGN PATENT DOCUMENTS

KR 10-2013-0047217 A 5/2013
KR 10-1587182 B1 2/2016

*Primary Examiner* — Tuan T Dinh
*Assistant Examiner* — Rockshana Chowdhury
(74) *Attorney, Agent, or Firm* — Birch, Stewart, Kolasch & Birch, LLP

(57) ABSTRACT

A portable keyboard includes a plurality of key assemblies including a plurality of key tops, a main body of a pillar shape of n angles, which is located in the vicinity of a first key assembly among a plurality of the key assemblies and includes a plurality of sides, a flexible connection member configured to connect a plurality of the key assemblies with the main body, and a main board configured to be embedded in the inside of the main body and process input signals inputted from a plurality of the key assemblies. In this case, the main body includes a first side of which one edge of the first side is connected with the flexible connection member, a second side adjacent to another edge of the first side and the second side of which an angle with the first side is equal to or greater than 90 degrees, and a cradle configured to combine one end of the cradle with the second side using a hinge to make the cradle to be rotated and the cradle configured to be contacted with the second side.

10 Claims, 10 Drawing Sheets

Related U.S. Application Data

(60) Provisional application No. 62/322,766, filed on Apr. 14, 2016.

(51) Int. Cl.
*H01H 13/70* (2006.01)
*G06F 3/023* (2006.01)

(58) Field of Classification Search
USPC .................................................. 361/679.08
See application file for complete search history.

(56) References Cited

U.S. PATENT DOCUMENTS

| | | | |
|---|---|---|---|
| 2013/0107438 A1* | 5/2013 | Lee | G06F 3/0221 361/679.08 |
| 2013/0163187 A1* | 6/2013 | Wang | G06F 1/1632 361/679.41 |
| 2013/0279096 A1* | 10/2013 | Gengler | H05K 7/00 361/679.01 |
| 2014/0029185 A1 | 1/2014 | Leong et al. | |
| 2015/0198975 A1 | 7/2015 | Chen et al. | |
| 2015/0198980 A1 | 7/2015 | Aoki et al. | |
| 2015/0198982 A1* | 7/2015 | Lee | G06F 3/0221 361/679.08 |
| 2016/0098097 A1 | 4/2016 | Chang et al. | |

\* cited by examiner

[Fig. 1a]
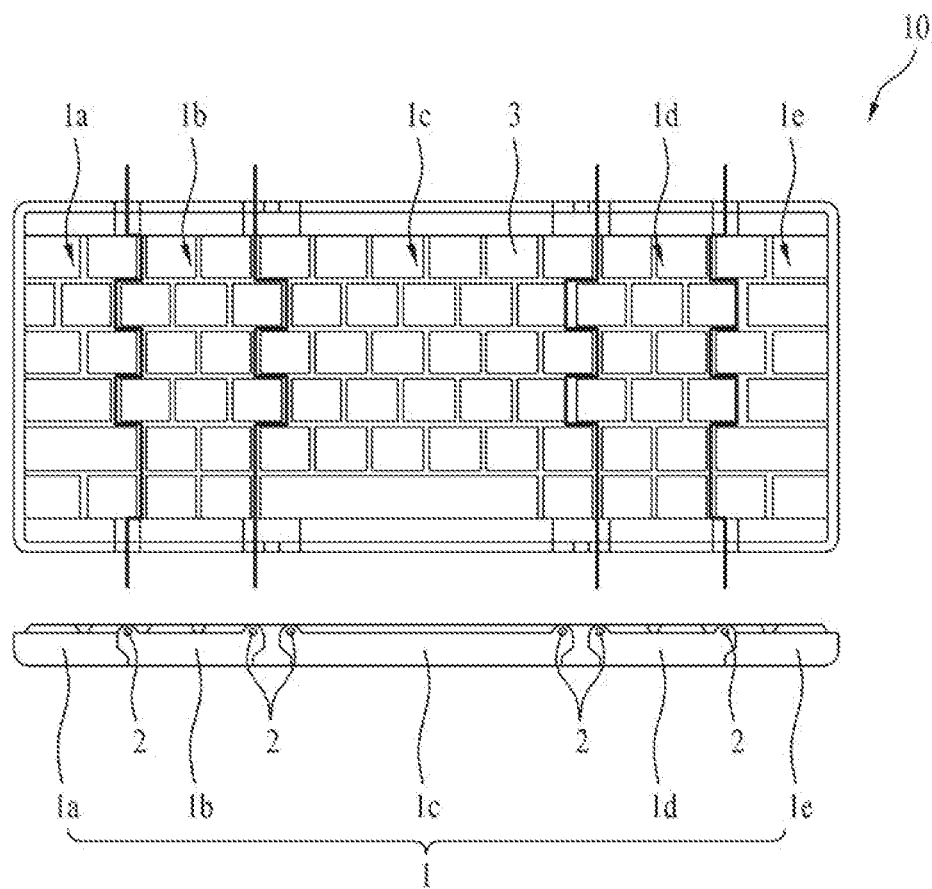

[Fig. 1b]
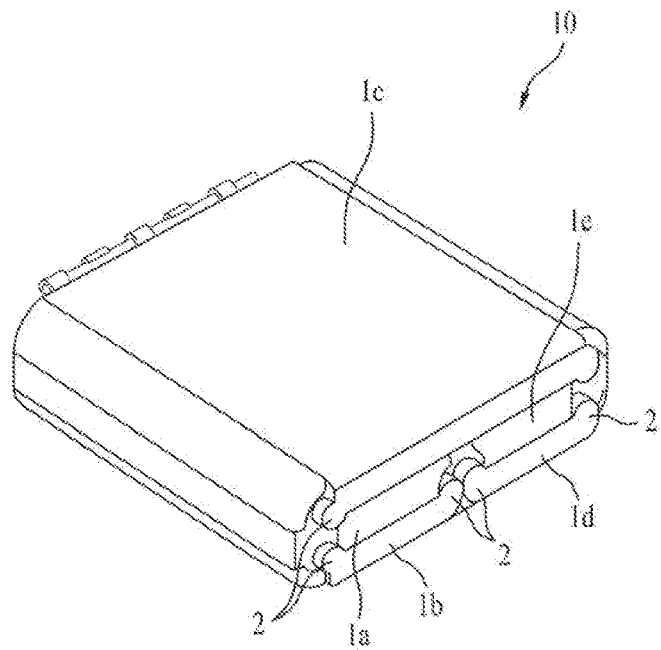
[Fig. 2a]
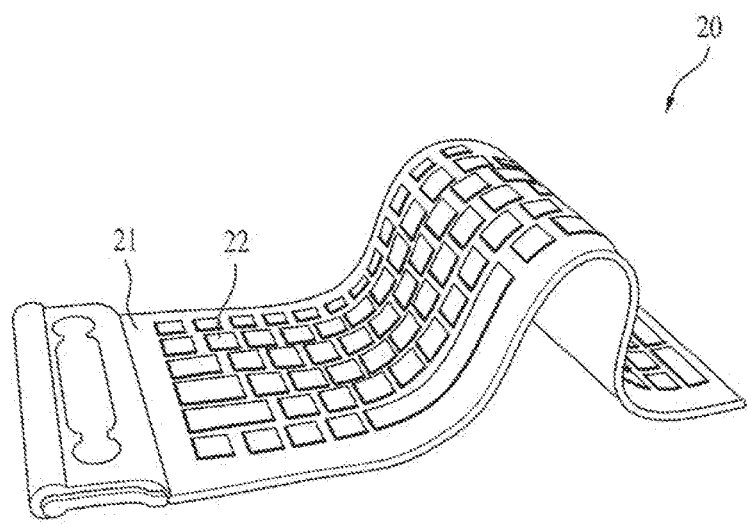

[Fig. 2b]
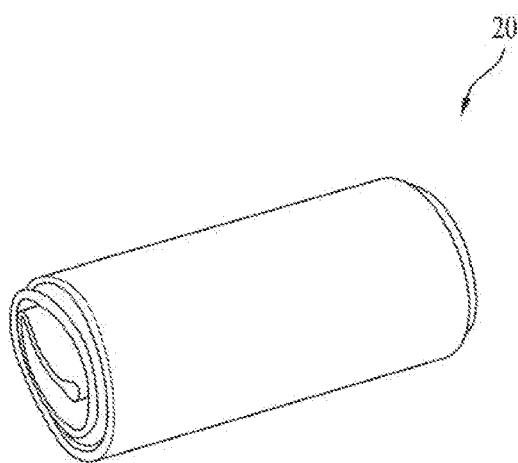
[Fig. 3]
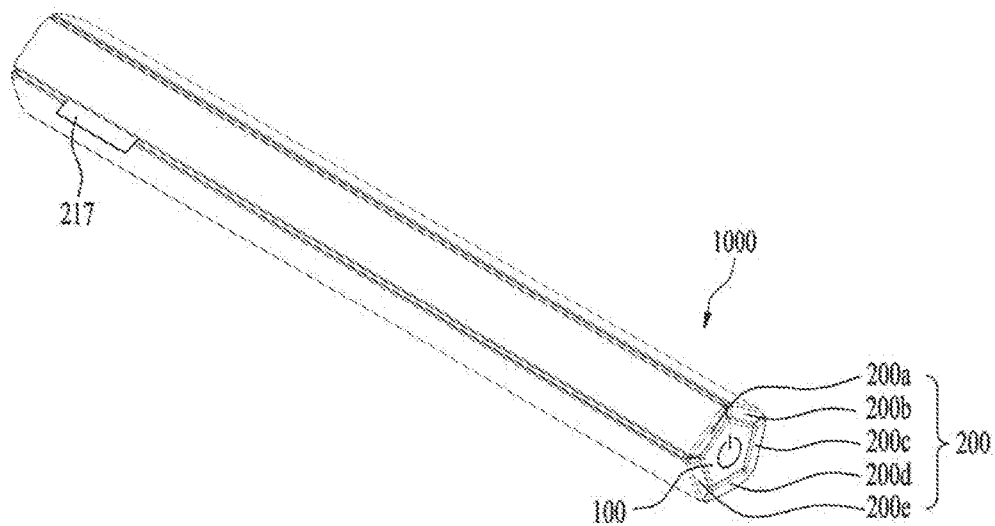

[Fig. 4]
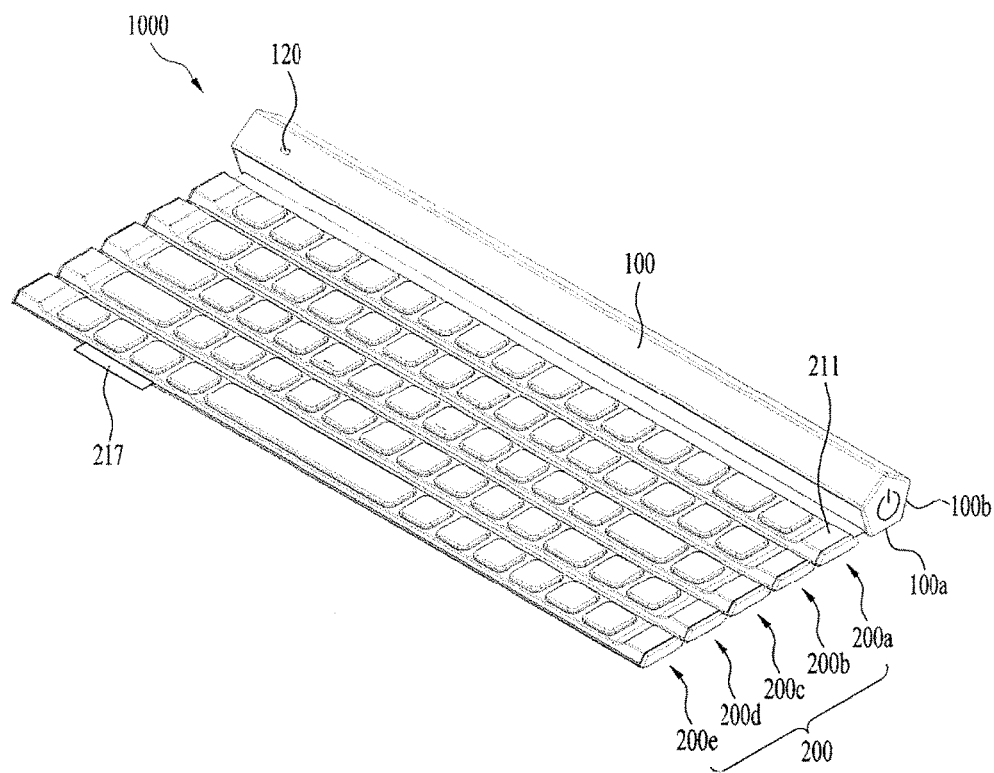
[Fig. 5a]
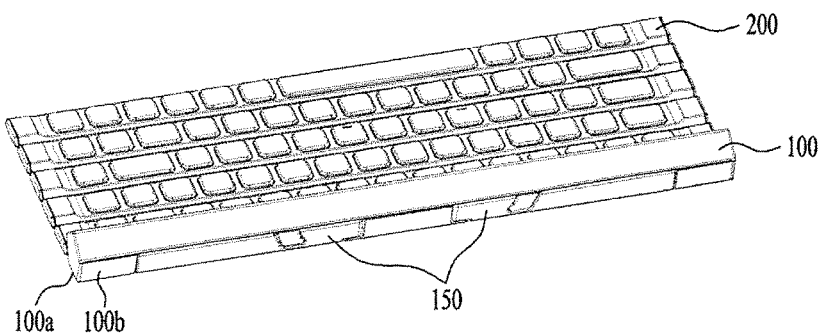

[Fig. 5b]
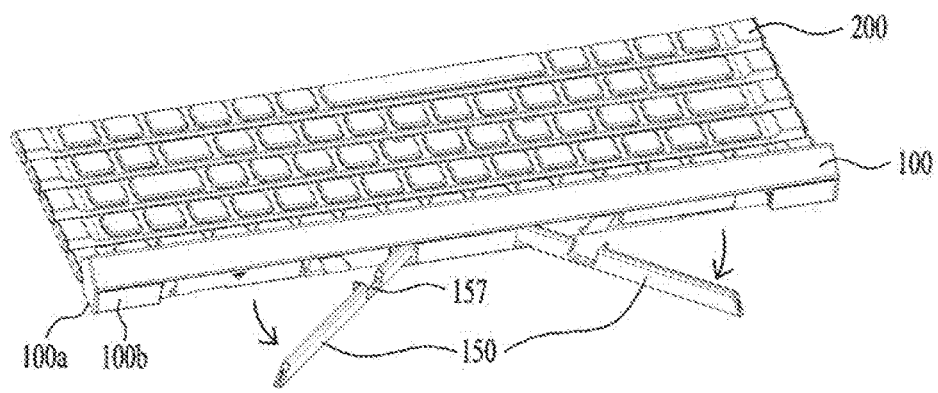
[Fig. 5c]
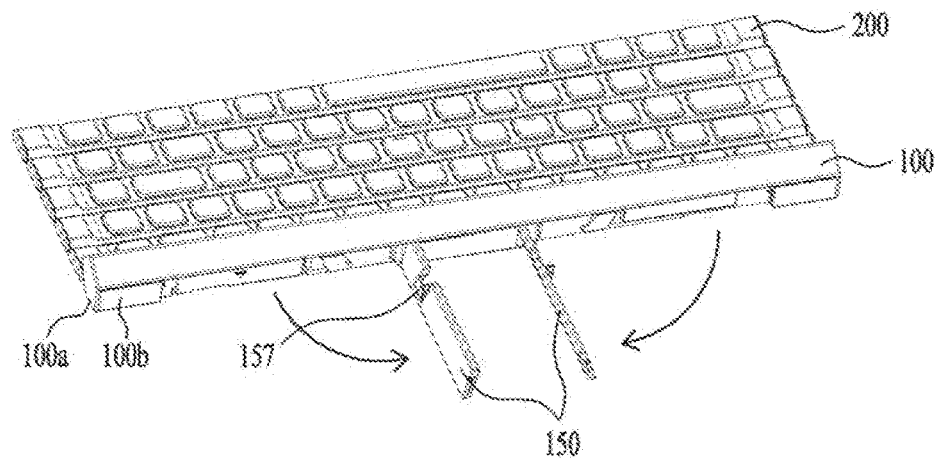

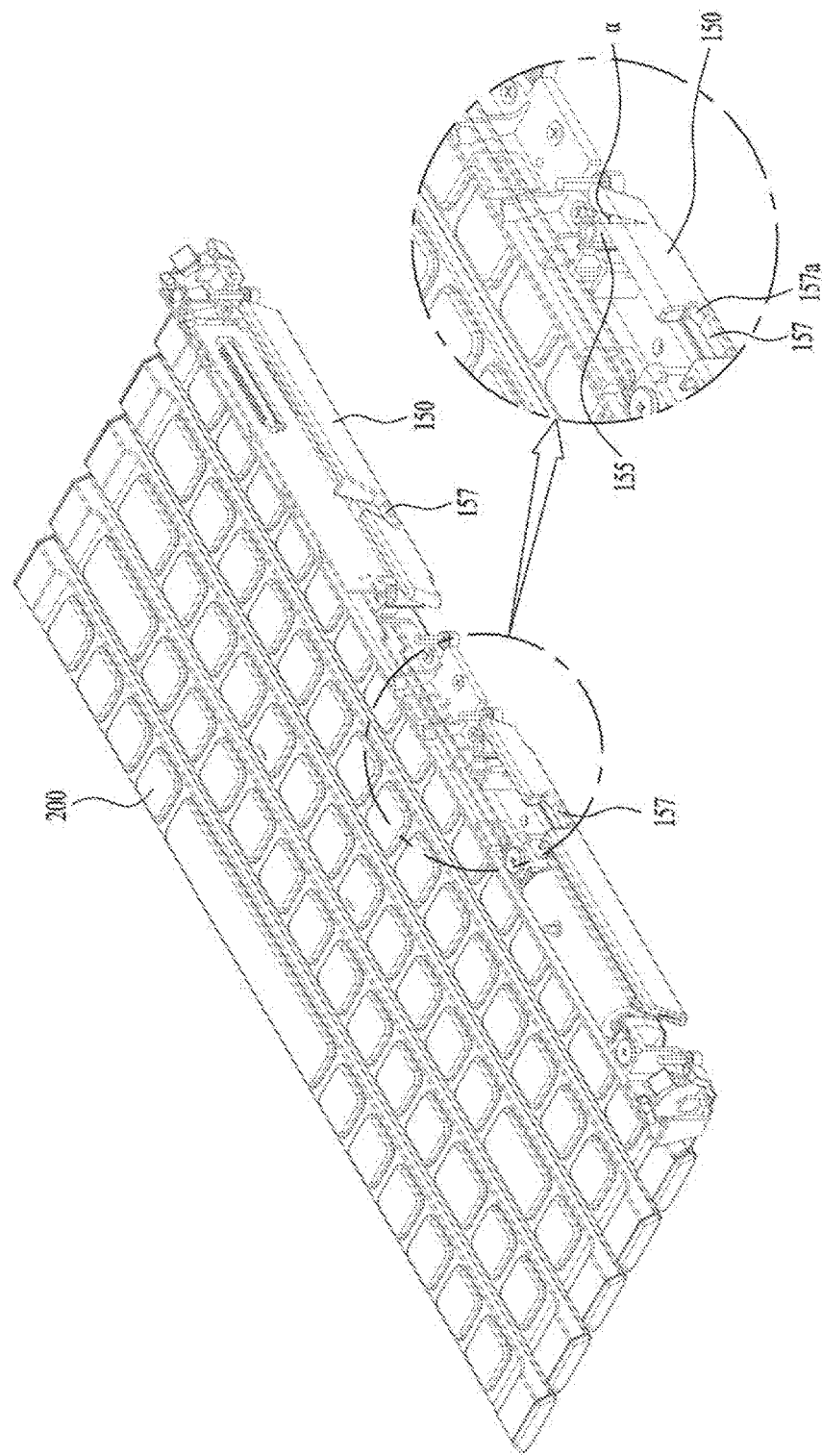
[Fig. 6]

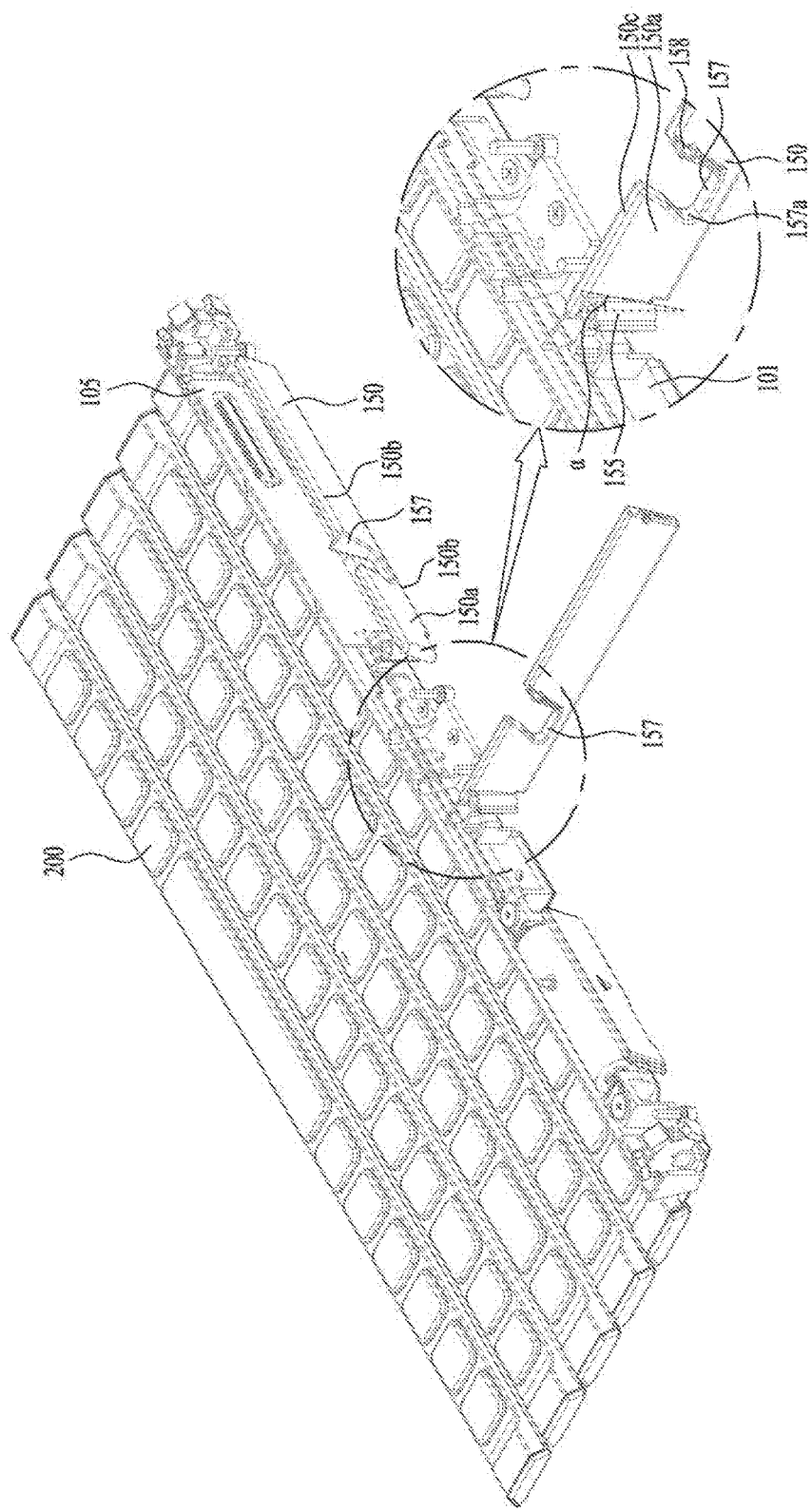
[Fig. 7]

[Fig. 8a]
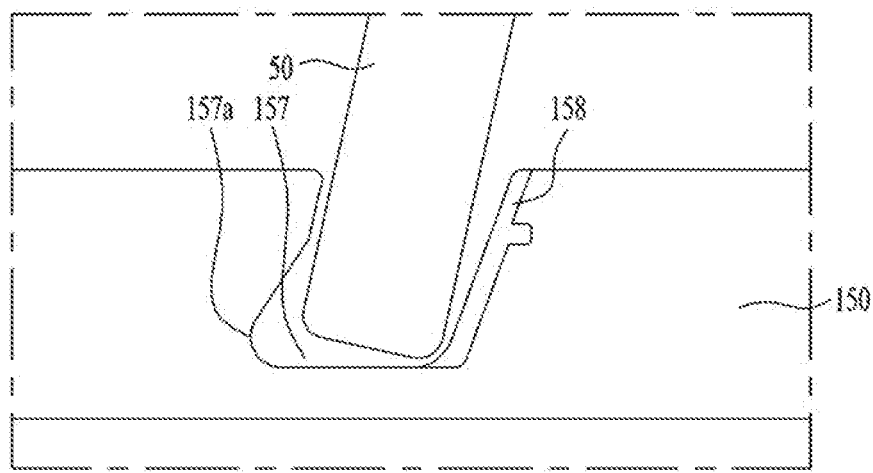
[Fig. 8b]
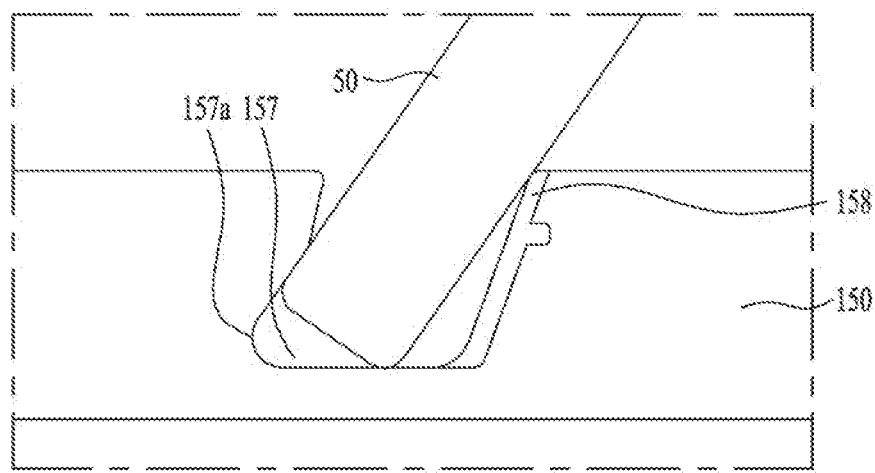

[Fig. 9]
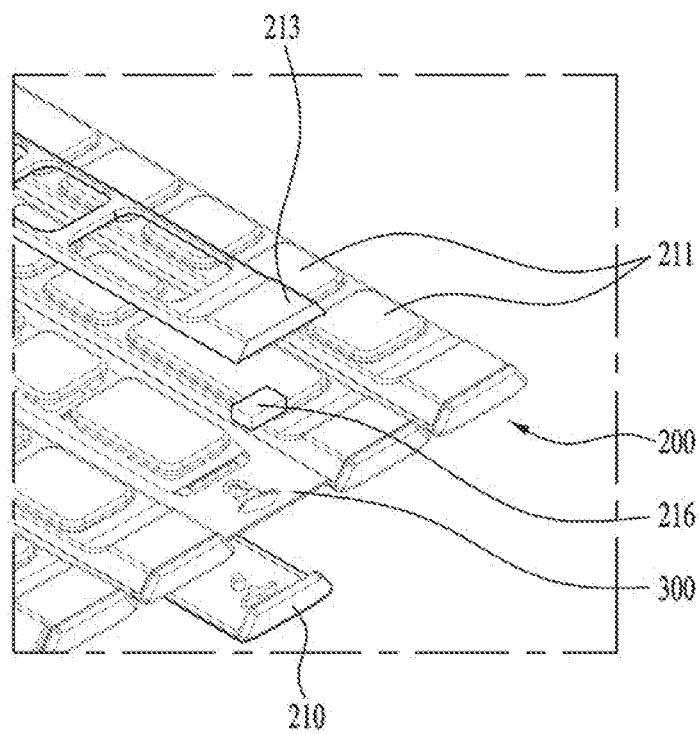
[Fig. 10a]
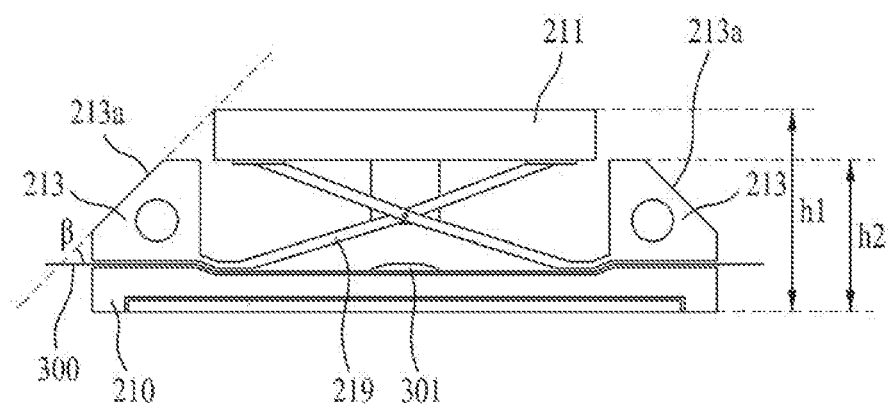

[Fig. 10b]
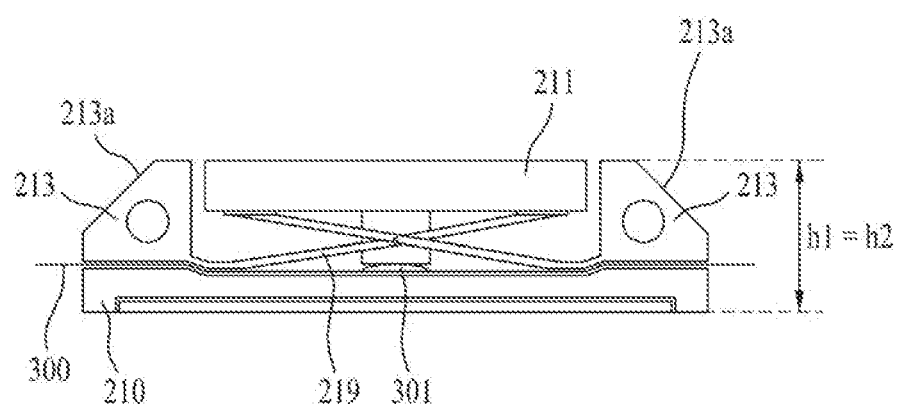

PORTABLE KEYBOARD

CROSS REFERENCE TO RELATED APPLICATIONS:

This application is a Continuation of PCT International Application No. PCT/KR2016/008931 filed on Aug. 12, 2016, which claims priority under 35 U.S.C. § 119(e) to U.S. Provisional Application No. 62/322,766 filed on Apr. 14, 2016 and under 35 U.S.C. § 119(a) to Patent Application No. 10-2016-0050196 filed in the Republic of Korea on Apr. 25, 2016, all of which are hereby expressly incorporated by reference into the present application.

TECHNICAL FIELD

The present invention relates to a portable keyboard, more particularly, to a keyboard that a structure is simple and portability is enhanced.

BACKGROUND ART

Recently, as dissemination of such a mobile terminal as a smartphone, a tablet PC and the like is expanded, development of a portable keyboard as an input device of the mobile terminal is vitalizing.

Recently, as dissemination of such a mobile terminal as a srnartphone, a tablet PC d the like is expanded, development of a portable keyboard as an input device of the mobile terminal is vitalizing.

FIG. 1a is a plane view and a side view of a folding keyboard 10 according to a related art and FIG. 1b is a schematic diagram for a folded state of the folding keyboard 10 according to the related art.

As shown in FIG. 1a and FIG. 1b, the folding keyboard 10 according to the related art is separated from each other in vertical direction and includes 5 bodies (first body to fifth body) 1a/1b/1c/1d/1e connected with each other by hinges 2. Each body has a plurality of keys 3. In particular, when a user carries the folding keyboard 10 according to the related art, since a first body 1a and a second body 1b and a fourth body 1d and a fifth body 1e, which are respectively connected with the left and the right of a third body 1c by hinges, are designed to be folded toward the third body 1c, it may be able to carry the folding keyboard 10 in a shape similar to a book.

Yet, since each body of the folding keyboard according to the related art is separated in vertical direction, as shown in FIG. 1a, a hinge axis for connecting separated bodies should be arranged in zigzag in accordance with key arrangement. Hence, there exists a structural problem that a connection unit has no choice but to be complicated. And, since a hinge axis is designed in zigzag, exterior of the folding keyboard is not easy on the eye when the folding keyboard is folded to be carried, Moreover, when the folding keyboard is folded, since the volume of the folding keyboard is similar to the volume of a general book, there is a problem in that portability and storage of the folding keyboard is not good.

FIG. 2a is a plane view and a side view of a portable keyboard 20 according to the related art and FIG. 2b is a schematic diagram for a folded state of the portable keyboard 20 according to the related art.

As shown in FIGS. 2a and 2b, the portable keyboard 20 according to the related art is made of silicon corresponding to a flexible material and includes a main body 21 and a plurality of keys 22 integrated on the main body 21. As shown in FIG. 2b, since the portable keyboard 20 according to the related art is made of silicon, when a user carries the portable keyboard, the user can carry the portable keyboard in a state of being rolled, thereby increasing portability.

Yet, since keys of the portable keyboard 20 according to the related art are also made of silicon, when a user pushes the keys, there exists a problem in that a sense of touching keys and a key recognition rate are not good. Hence, when the portable keyboard according to the related art is used, there is a problem in that a typo rate of a user is high.

SUMMARY OF THE INVENTION

One object of the present invention is to provide a portable keyboard capable of being folded in a small size to improve portability and storage.

To achieve these and other advantages and in accordance with the purpose of the present invention, as embodied and broadly described, according to one embodiment, a portable keyboard includes a plurality of key assemblies including a plurality of key tops, a main body of a pillar shape of n angles, which is located in the vicinity of a first key assembly among a plurality of the key assemblies and includes a plurality of sides, a flexible connection member configured to connect a plurality of the key assemblies with the main body, and a main board configured to be embedded in the inside of the main body and process input signals inputted from a plurality of the key assemblies. In this case, the main body includes a first side of which one edge of the first side is connected with the flexible connection member, a second side adjacent to another edge of the first side and the second side of which an angle with the first side is equal to or greater than 90 degrees, and a cradle configured to combine one end of the cradle with the second side using a hinge to make the cradle to be rotated and the cradle configured to be in contact with the second side.

The flexible connection member can be folded to make an upper side of a plurality of the key assemblies to be rolled while being in contact with a side of the main body.

The n is equal to or greater than 5 and a plurality of the sides may have a same size.

A rotation axis of the hinge is arranged in a manner of being orthogonal to the first side and the cradle can be slantingly combined in a direction of the rotation axis of the hinge.

The cradle can be combined with a location separated from the hinge axis in a manner of being combined with an outskirt of the hinge.

An angle (α) formed by the hinge axis and the cradle may correspond to (90-360/n)°.

A plurality of the key tops are arranged side by side in first direction, a plurality of the key assemblies are arranged side by side in second direction, and upper part of both ends of second direction of the key assembly may have a slope slanted with an angle of β=(90-180/n)°.

The cradle further includes a mounting groove which is formed at a position where the first side faces an upper side when the first side is mounted on the floor and the mounting groove can have a slope slanted more towards the hinge direction as going into an inner side of the mounting groove.

The portable keyboard may further include a rib which is projected to the second side of the main body around the mounting groove of the cradle.

The inner side of the mounting groove can be wider than an entrance of the mounting groove in the hinge direction.

The key assembly can include a bottom frame on which the flexible connection member and a plurality of the key tops are seated and a top frame at which an opening corresponding to the key top is formed and the top frame combined with the bottom frame.

The portable keyboard may further include a first magnet arranged between the top frame and the bottom frame and a second magnet or a metallic part combined by magnetic power of the first magnet installed in the main body. In this case, a plurality of the key assemblies can be fixed in a state of being rolled around the main body due to the magnetic power of the first magnet.

The portable keyboard may further include an open tab projected from a key assembly farthest from the main body among a plurality of the key assemblies.

The open tab can be made of a flexible material.

According to the aforementioned technical solution, a structure of a portable keyboard can be simplified according to the present invention. By doing so, it is able to increase a manufacturing speed of a portable keyboard and reduce a manufacturing cost at the same time according to the present invention.

According to the present invention, when a user carries a portable keyboard, since an exterior of the portable keyboard is configured by a shape of a pillar of n angles (i.e., a shape of a bar), it is able to increase portability and storage of the portable keyboard, According to the present invention, when a user carries a portable keyboard, since there is no uneven projected part on an exterior of the portable keyboard and it is not necessary to use a hinge, it is able to enhance beauty of the portable keyboard.

And, since a keyboard is equipped with a cradle without a separate supporting device, it is able to provide a portable keyboard capable of easily mounting a mobile terminal on the portable keyboard.

According to the present invention, since a portable keyboard has key arrangement similar to that of a legacy keyboard, thereby increasing user convenience.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 1a is a plane view and a side view of a folding keyboard according to a related art and FIG. 1b is a schematic diagram for a folded state of the folding keyboard. according to the related art;

FIG. 2a is a plane view and a side view of a portable keyboard according to the related art and FIG. 2b is a schematic diagram for a folded state of the portable keyboard. according to the related art;

FIG. 3 is a schematic perspective diagram for a folded state of a portable keyboard according to one embodiment of the present invention;

FIG. 4 is a schematic perspective diagram for an opened state of a portable keyboard according to one embodiment of the present invention;

FIGS. 5a to 5c area diagram for a shape of opening a cradle in a state that a portable keyboard is opened according to one embodiment of the present invention;

FIGS. 6 and 7 are diagrams for a shape of a hinge for connecting a cradle and a main body of a portable keyboard according to one embodiment of the present invention;

FIGS. 8a and 8b are a disassembling perspective diagram for a key assembly of a portable keyboard according to one embodiment of the present invention;

FIG. 9 is a diagram for a mounting groove of a portable keyboard according to one embodiment of the present invention;

FIGS. 10a and 10b are schematic cross-sectional diagrams for a key assembly of e present invention;

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

FIG. 3 is a schematic perspective diagram for a folded state of a portable keyboard 1000 according to one embodiment of the present invention and FIG. 4 is a schematic perspective diagram for an opened state of a portable keyboard 1000 according to one embodiment of the present invention.

As shown in FIG. 3 and FIG. 4, a portable keyboard 1000 according to one embodiment of the present invention includes a key assembly 200 including a plurality of keys, a main body 100 configured to control an input signal inputted from the key assembly 200 and transmit the controlled input signal to a mobile terminal (e.g., smartphone, tablet PC, etc.), and a flexible connection member 300 (FIG. 9) configured to electronically and/or mechanically connect the key assembly 200 and the main body 100 with each other.

Preferably, a portable keyboard 1000 according to the present invention may correspond to a keyboard of a pantograph scheme to slim down an overall size of the portable keyboard. A plurality of the key assemblies 200 are connected with each other by a flexible connection member 300. A plurality of the key assemblies include a plurality of keys or key tops 211 (FIG. 9) arranged in horizontal direction (first direction) by a straight line. An overall shape of a plurality of the key assemblies 200 corresponds to an elongated shape. In particular, each of a plurality of the key assemblies 200 corresponds to a part separated on the basis of horizontal key columns in a general keyboard.

A plurality of the key assemblies 200 are arranged side by side in vertical direction (second direction) and the first direction and the second direction are orthogonal to each other. As shown in FIG. 4, a plurality of the key assemblies 200 can include a first key assembly 200*a*, a second key assembly 200*b*, a third key assembly 200*c*, a fourth key assembly 200*d*, and a fifth key assembly 200*e*. Of course, this is an example only. The present invention is not limited by the aforementioned example. It may further include such an additional key assembly as a sixth key assembly, a seventh key assembly and the like according to the usage of the portable keyboard 1000.

In a general QWERTY keyboard, a text part includes 3 columns and such a key as a space key, a Ctrl key, an Alt key, and the like are arranged at the bottom part of the keyboard. Hence, at least 4 or more key assemblies 200 are necessary.

In case of using 5 key assemblies 200 by adding one column for number keys, it may be able to provide a portable keyboard 1000 having a key arrangement almost identical to that of a general QWERTY keyboard. In addition, it may use 6 key assemblies 200 to further arrange a function key.

A main body 100 has a shape of a pillar of multiple angles including the number of sides corresponding to the number of key assemblies 200. When a user carries the portable keyboard 1000, a plurality of the key assemblies 200 are rolled (refer to FIG. 3) in a manner of surrounding the main body 100. When the portable keyboard 1000 is used, a plurality of the key assemblies are opened in a manner of being unrolled on the basis of the main body 100 (refer to FIG. 4). When each of a plurality of the key assemblies is folded in a manner of being rolled, an upper side of each of a plurality of the key assemblies 200 is configured to be contacted with an outer circumference surface (i.e., each side) of the main body 100.

The main body 100 is arranged in the vicinity of a key assembly (a first key assembly 200*a* in FIG. 4) located at one end of second direction among a plurality of the key assemblies 200 arranged in second direction side by side. The main body 100 is located in parallel with a plurality of the key assemblies 200.

A key assembly (e.g., a fifth key assembly 200*e* farthest from the main body 100 among a plurality of the key assemblies 200 when a plurality of the key assemblies are opened) located at an another end of second direction among a plurality of the key assemblies 200 may include an open tab 217 projected to an outer side. When the portable keyboard 1000 is folded in a manner of being rolled for carrying the keyboard, it is able to easily unfold a plurality of the key assemblies 200 using the open tab 217.

If the open tab is made of such a soft material as fabric, it may be able to reduce a problem that the open tab is cumbersome when a plurality of the key assemblies 200 are rolled in the main body 100.

The key assembly 200 can include magnet at both ends of the first direction. Hence, when a user carries the portable keyboard, a plurality of the key assemblies 200 can be fixed with each other in a folded state due to magnetism of the magnet. When a user carries the portable keyboard 1000, the portable keyboard can maintain a pillar shape of regular n angles of an elongated shape without being unfolded.

Hence, a plurality of the key assemblies 200 can maintain a rolled state using magnetism without any separate fixing means. Since a separate fixing means is omitted, a structure of the portable keyboard 1000 can be simplified.

The main body 100 includes a controller configured to control an input signal inputted from the key assembly 200 and a wireless communication module configured to transmit the input signal controlled by the controller to a mobile terminal.

The main body 100 is electronically and/or mechanically connected with a plurality of the key assemblies 200 by a flexible connection member 300.

A cross section of the main body 100 corresponds to a shape of regular n angles. In this case, the number of a plurality of the key assemblies 200 corresponds to n. The number of a plurality of the key assemblies 200 is determined according to the usage of the keyboard (i.e., whether or not it is necessary to have a function key or a special key). When the number of a plurality of the key assemblies 200 is determined, a cross section of the main body 100 is also determined. For example, as shown in FIG. 3 and FIG. 4, if key columns of horizontal direction of 5 lines are necessary only, a plurality of the key assemblies 200 are configured by 5 key assemblies and a shape of a cross section of the main body 100 becomes a regular pentagon. In particular, the main body 100 forms a pillar shape of regular n angles that a size of each side is equal and an angle formed by each side is equal.

Preferably, the main body 100 may have a horizontal length corresponding to a horizontal length of a plurality of key assemblies 200. Width of each side of the main body 100 may have a length corresponding to a length of second direction of an upper surface of each key assembly 200.

A dome switch 301 (FIGS. 10*a* and 10*b*) is installed on the top of flexible connection member 300 at a position corresponding to each key top 211. The flexible connection member 300 mechanically and/or electronically connects a plurality of the key assemblies 200 with each other and electronically and/or mechanical connects a plurality of the key assemblies 200 with the main body 100. Specifically, the flexible connection member 300 electronically connects a plurality of the key assemblies 200 with the main body 100 and mechanically connects a plurality of the key assemblies 200 with the main body 100 to make a plurality of the key assemblies 200 wrap an outer circumference surface of the main body 100 while being connected with the main body 100.

To this end, the flexible connection member 300 has a bendable characteristic. Preferably, the flexible connection member 300 may correspond to a FPCB (flexible printed circuit board). As shown in FIG. 4, when the portable keyboard 1000 is opened, the FPCB can be connected with one edge of a first side 100*a* of the main body 100 placed on the floor. When a user carries the portable keyboard 1000, a plurality of the key assemblies 200 can wrap an outer circumference surface of the main body 100 in a manner that the FPCB is installed in the bottom side of the main body 100 and the bottom side of a plurality of the key assemblies 200. In particular, the FPCB plays a role of an articulated connection unit between the main body 100 and the key assembly 200 and between the key assemblies 200.

The FPCB is equipped with an outer layer. Preferably, the outer layer can be configured by one material selected from the group consisting of PET (polyethylene terephthalate), PP (polypropylene) and Kevlar.

If the FPCB is used, since it is not necessary to use a complicated hinge structure used in the related art, it is able to simplify a structure of the portable keyboard 1000. Hence, it is able to reduce not only a manufacturing time but also a manufacturing cost of the portable keyboard 1000.

The flexible connection member 300 transmits input signals received from a plurality of the key assemblies 200 to the main body 100. In particular, the flexible connection member 300 detects push on a key of each of a plurality of the key assemblies 200 and transmits an input signal corresponding to a pushed key to the main body 100.

The main body 100 includes a housing 101 of a pillar shape of n angles of a hollow bar form, a main board 105 installed in the inside of the housing 101, a battery, a wireless communication unit, etc. (FIG. 7) As mentioned in the foregoing description, the flexible connection member 300 is connected with the main board 105 in a manner of being connected with one edge of a first side 100a. The main board 105 receives a signal, which is generated when a user pushes each key top 211, via the flexible connection member 300 and transmits the signal to a connected external terminal via the wireless communication unit.

The wireless communication unit can include at least one selected from the group consisting of a BLUETOOTH communication module, a ZIGBEE communication module and a WIFI communication module, Since a portable keyboard 1000 does not have a separate display unit, according to the related art, an external terminal is connected with the portable keyboard 1000 and a pin code is inputted to connect the portable keyboard 1000 and the external terminal with each other. Yet, a portable keyboard 1000 according to the present invention is equipped with a paring button to make the portable keyboard is to be immediately connected with a predetermined external terminal. Two or more pairing buttons are installed in the portable keyboard so as to alternately use the portable keyboard with various devices such as a tablet and a mobile phone and the like.

The portable keyboard 1000 can include a battery to supply power to each of a plurality of key assemblies to generate a signal and supply power for wireless communication with an external terminal. If the battery corresponds to an embedded type battery, the battery can be charged via a USB cable or the like. If the battery corresponds to a replaceable outer mounted battery, it is not necessary to have a separate charging port.

In case of an outer mounted battery, an entrance of a battery insertion unit can be installed in a first side 100a of the main body 100 to make the battery insertion unit not to be exposed. Or, the entrance of the battery insertion unit can be arranged at a second side 100b of the main body. The second side is exposed when a cradle 150 arranged at the second side of the main body 100 is opened.

The main body can further include an indicator 120. The indicator 120 can indicate battery remains or an external terminal paired with the portable keyboard via a plurality of colors or a flickering scheme. For example, if a residual amount of power of a battery is 70% to 100% of a charging amount, the indicator 120 can be configured to radiate green color. If the residual amount of power of the battery is 70% to 30% of the charging amount, the indicator 120 can be configured to radiate yellow color. If the residual amount of power of the battery is 30% to 1% of the charging amount, the indicator 120 can be configured to radiate red color.

A display unit can be installed in one side of the main body 100. Information on a status of the portable keyboard 1000 can be displayed on the display unit. Specifically, a controller of the min body 100 can control the display unit to display the information on the status of the portable keyboard 100 on the display unit.

In this case, the information on the status of the portable keyboard 100 can include at least one selected from the group consisting of information on an residual amount of battery power, information on signal strength of the wireless communication module, and information on a type of a mobile terminal paired with the portable keyboard 1000 in wireless. The information is an example only. The present invention is not limited by the example.

FIG. 5a to FIG. 5c are diagrams for a shape of opening a cradle 150 in a state that a portable keyboard 1000 is opened according to one embodiment of the present invention.

When the portable keyboard 1000 is opened, the portable keyboard and a key assembly 200, which is extended from one edge of a first side 100a, are arranged side by side and the first side 100a is seated to the floor. A second side 100b corresponds to a side adjacent to another edge, which is an opposite side of the one edge to which the key assembly 200 is connected. When a user uses the portable keyboard 1000, the second side is located at a side opposite to a side at which the user is facing.

The first side 150a of a cradle 150 is combined with the second side 100b using a hinge 155 to make the first side rotate. As shown in FIG. 5a, when the cradle 150 is closed, the first side is arranged in a manner of covering the second side 100b of the main body 100. In particular, the cradle 150 corresponds to a board of a rectangular covering at least a part of the second side 100b and has a shape of a tape extended according to the second side 100b of the main body.

As shown in FIG. 5b, if the cradle 150 is opened, as shown in FIG. 5c, a second side 50b adjacent to the first side 100a is in contact with the floor and the cradle 150 is separated from the second side 100b except the first side 150a. Consequently, as shown in FIG. 5c, the cradle is arranged in a manner of being orthogonal to the main body 100. As shown in FIG. 5c, when the cradle 150 is opened, it may be able to set a limit on an angle of a hinge to make the hinge not to be rotated anymore in a manner that the cradle is in touch with a housing 101 of the main body 100.

A mounting groove 157 is formed on the second side 150b and a third side 150c to put a tablet or a mobile terminal on the mounting groove. Since the mounting groove 157 is located near a hinge 155 among the total length of the cradle 150, although a mobile terminal is inserted into the mounting groove 157, the cradle 150, which is extended toward the back of the mounting groove 157, can support the mobile terminal.

As shown in FIG. 5c, one or more pairs of the cradle 150 are installed and a space between cradles 150 can be narrowly formed to stand a mobile terminal of a small size. In order to stably stand a mobile terminal of which width is wide such as a tablet, it may be able to further install the cradle 150 in both ends of the main body 100.

In case of using 4 key assemblies 200, a first side 100a and a second side 100b are arranged in a manner of being orthogonal to each other. In case of using 5 or more key assemblies 200, since the main body 100 is formed by a shape of a pillar of multiple angles equal to or greater than 5 angles, the first side 100a and the second side 100b have an angle greater than 90 degrees.

When the first side 100a and the second side 100b have an angle greater than 90 degrees, if a hinge 155 is deployed in width direction of the second side 100b, a cradle 150 is opened in a manner of being rotated on the basis of the hinge 155. In this case, there is a problem in that the first side 1100a and the cradle 150 are not arranged side by side and the cradle 150 is opened in a manner of being leant towards the floor.

In order to solve the problem, when a portable keyboard 1000 has 5 or more key assemblies 200, the cradle 150 according to the present invention has an enhancement in a structure of a cradle 150 and a hinge 155 that the cradle 150 is not leaning towards bottom direction of the first side 100a and the cradle and the first side are arranged side by side.

FIGS. 6 and 7 are diagrams for a shape of a hinge 155 for connecting a cradle 150 and a main body 100 of a portable keyboard 1000 according to one embodiment of the present invention.

According to the present invention, a rotation axis of the hinge 155 is arranged in a manner of being orthogonal to a first side 100a and the cradle 150 is slantingly combined with the rotation axis of the hinge 155. When the cradle 150 is closed, since the cradle and a second side 100b are arranged side by side, an angle (α) formed by a hinge axis and the cradle 150 is smaller than an angle formed by the first side 100a and the second side 100b as much as 90 degrees.

In particular, when the main body corresponds to a regular polygon of n angles that sizes of key assemblies are identical to each other, an angle between sides corresponds to (180-360/n)°. Hence, the angle (α) formed by the hinge axis and the cradle 150 becomes (90-360/n)°. If the cradle 150 rotates on the basis of the hinge axis of the hinge 155, the cradle 150 rotates in a state of being slanted towards the floor. Referring to FIG. 7, the cradle 150 is not orthogonal to the floor (100a, first side) of the main body 100 and the second side 100b is also slanted with a same angle.

The cradle 150 is separated from the hinge axis and is combined with an outer circumference surface of the hinge 155. This is intended not to make the hinge to be exposed to external by placing the hinge in the inside of the main body 100 when the cradle 150 is closed.

FIGS. 8a and 8b is a mounting groove 157 of a portable keyboard 1000 according to one embodiment of the present invention. As shown in FIG. 8a, the mounting groove 157 is a shape of a rectangular slanted more towards a hinge 155 as going to a second side from a third side. A part near the second side is wider. The part near the second side is more extended towards the hinge 155. This in intended, as shown in FIG. 8b, to prevent a thin mobile terminal 50 from being dropped out of the mounting groove 157 when the thin mobile terminal is put on the mounting groove.

As shown in FIG. 7, in order to make the mobile terminal 50 inserted into the mounting groove 157 to be more stably seated at the mounting groove 157, it may further include a rib in a direction tar from the hinge 155 of the cradle 150, i.e., in a direction at which a rear side of the mobile terminal 50 is located. As shown in FIG. 5a, in order to make the cradle 150 not to be projected in a state of being combined with the main body 100, the rib 158 is projected to a direction of a side contacted. with the main body 100.

FIG. 9 is a disassembling perspective diagram for a key assembly 200 of a portable keyboard 1000 according to one embodiment of the present invention. The key assembly 200 according to the present invention includes a bottom frame 210, a top frame 213, and a plurality of key tops 211 located between the bottom frame 210 and the top frame 213. A flexible connection member 300 is arranged between the bottom frame 210 and the top frame 213.

The flexible connection member 300 can form a hole in a manner of partly eliminating a part located at the inside of the key assembly 200. Since a part located between key assemblies 200 is exposed to the external, the part can be coated by color identical to the color of the key assembly 200 or a different color by covering the flexible connection member 300.

A dome switch 301, which is pressed by pushing a key top 211, is arranged at the flexible connection member 300. A signal generated by pushing the dome switch 301 is delivered to the main body 100. In particular, the flexible connection member 300 connects the main body 100 and a plurality of the key assemblies 200 with each other.

First magnet 216 is arranged at the left and the right of the key assembly 200 and second magnet (not depicted) having a magnetic polarity opposite to that of the first magnet 216 or a magnetic substance capable of being combined with the first magnet 216 is arranged at the main body 100. By using the magnet (or the magnetic substance), the main body 100 and the key assembly 200 can be stably combined with each other without any separate combination structure.

An outer circumference surface of the first magnet 216 can be equipped with a magnet shielding member in the inside of the top frame 213. Preferably, the magnet shielding member may correspond to a plate-like member made of a metallic material. If the magnet shielding member is equipped, it may be able to prevent magnet power of the magnet for fixing a rolled state of a plurality of key assemblies 200 from adversely affecting (e.g., key recognition rate degradation, error of recognizing a key, disturbance, or the like) an electronic signal delivered by the flexible connection member 300 corresponding to the FPCB.

The first magnet 216 is arranged between a bottom frame 210 and a top frame 213 and combines the top frame 213 and the bottom frame 210 with each other without a separate structure for fixing the first magnet 216. By doing so, it is able to immediately fix the first magnet 216. Hence, it is able to simplify a structure of the key assembly 200, thereby reducing a manufacturing cost.

FIGS. 10a and 10b are schematic cross-sectional diagrams for a key assembly 200 of the present invention. An elastic member for supporting a plurality of key tops 211 is installed in the bottom of a plurality of the key tops 211. The elastic member 219 includes two links that intersect. Both ends of the two links are equipped with a sliding member capable of being slid at the bottom of the key top 211 and a sliding member capable of being slid at the top of the bottom frame 210. An end of the sliding member can be equipped with a spring.

As a modified embodiment, although it is not depicted in the drawing, the elastic member 219 may correspond to a compression spring connected with the bottom of the key top 211 and the top of the bottom frame 210.

When the key top 211 is pushed, the elastic member 219 is configured to elastically descend to a range only where the top of the key top 211 and the top of the top frame 213 are positioned at a same plane. In particular, when the key top 211 is pushed, the elastic member 219 is configured to elastically descend until a height (h1) of the top of the key top 211 and a height (h2) of the top of the top frame 213 become identical to each other. When the elastic member 219 is configured by the aforementioned two links, it may be able to implement it by setting a limit on a moving distance of the sliding member, When the elastic member 219 is configured by the aforementioned compression spring, it may be able to implement it by controlling elastic modulus and a compression rate of the compression spring.

As mentioned in the above, when the key top 2111 is pushed, if the elastic member 219 is configured to elastically descend to a range only where the top of the key top 211 and the top of the top frame 213 are positioned at a same plane, it may be able to prevent a fingernail from being bumped into the top frame 213 when the key top 211 is pushed, thereby increasing user convenience and preventing a fingernail from being damaged.

As mentioned in the foregoing description, the main body 100 includes a housing 101 of a pillar shape of n angles of a hollow bar form and the key assembly 200 wraps the housing 101 of the pillar shape of regular n angles. Hence, when a user carries the portable keyboard 1000, the portable keyboard 1000 can be configured to have the pillar shape of regular n angles. To this end, both ends of second direction of the key assembly 200 include a slope. As shown in FIG. 10a, an angle ($\beta$) of the slope becomes $(90-180/n)°$.

For example, as shown in FIG. 3 and FIG. 4, if the main body 100 has a pillar shape of regular pentagon (i.e., n=5), the number of a plurality of key assemblies 200 becomes 5 and the angle ($\beta$) of the slope of the key assembly 200 is cut to be 54 degrees to determine a cross sectional shape of the key assembly 200. As shown in FIG. 10a and FIG. 10b, the slope can be extended to make the slope to be contacted with the floor of the key assembly.

According to what is mentioned earlier, the present invention can make a structure of the portable keyboard 1000 simple. By doing so, it may be able to increase a manufacturing speed of the portable keyboard 1000 and reduce a manufacturing cost at the same time.

And, when a user carries the portable keyboard 1000, since an exterior of the portable keyboard is configured to have a shape of a pillar of n angles (i.e., bar shape), it is able to enhance portability and storage of the portable keyboard 1000. According to the present invention, when a user carries the portable keyboard, since there is no uneven projected part on an exterior of the portable keyboard and it is not necessary to use a hinge 155, it is able to enhance beauty of the portable keyboard.

And, since a keyboard is equipped with a cradle 150 without a separate supporting device, it is able to provide a portable keyboard capable of easily mounting a mobile terminal on the portable keyboard, According to the present invention, since a portable keyboard 1000 has key arrangement similar to that of a legacy keyboard, thereby increasing user convenience. According to the present invention, when a user carries the portable keyboard, since there is no uneven projected part on an exterior of the portable keyboard and it is not necessary to use a hinge, it is able to enhance beauty of the portable keyboard.

Thus, the foregoing preferred embodiments of the present invention are merely exemplary and are not to be considered as limiting the present disclosure. Thus, the scope of the present invention can be determined by rational interpretation of the attached claims and it is intended that the present invention covers the modifications and variations of this invention that come within the scope of the appended claims and their equivalents. It will be apparent to those skilled in the art that various modifications and variations can be made therein without departing from the spirit and scope of the invention.

The invention claimed is:

1. A portable keyboard, comprising:
a plurality of key assemblies including a plurality of key tops;
a main body having a pillar shape of n angles, and which is located in a vicinity of a first key assembly among the plurality of the key assemblies and includes a plurality of sides;
a flexible connection member connecting the plurality of the key assemblies with the main body; and
a main board embedded in an inside of the main body and processing input signals inputted from the plurality of the key assemblies,
wherein the main body comprises:
a first side having one edge connected with the flexible connection member,
a second side adjacent to another edge of the first side and the second side of which an angle with the first side is equal to or greater than 90 degrees, and
a cradle pivotally coupled to the second side using a hinge at one end, and the cradle being in contact with the second side when the hinge is closed,
wherein the n is equal to or greater than 5 and the plurality of the sides of the main body have a same size,
wherein a hinge axis of the hinge is arranged orthogonal to the first side and is slantingly arranged to a surface of the cradle,
wherein an angle ($\alpha$) formed by the hinge axis and the cradle corresponds to $(90-360/n)°$, and
wherein the cradle is combined with an outskirt of the hinge so a coupling portion of the cradle is separately located from the hinge axis.

2. The portable keyboard of claim 1, wherein the flexible connection member is folded to make an upper side of each of the key assemblies to be contacted with each side of the main body.

3. The portable keyboard of claim 1, wherein the plurality of the key tops are arranged side by side in a first direction and side by side in a second direction, and
wherein an upper part of both ends of the second direction of the key assembly has a slope slanted with an angle of $\beta=(90-180/n)°$.

4. The portable keyboard of claim 1, wherein the cradle further comprises a mounting groove which is formed at a position where the first side faces an upper side when the first side is mounted on a floor, and
wherein the mounting groove has a slope slanted more towards the hinge as moving into an inner side of the mounting groove.

5. The portable keyboard of claim 4, further comprising a rib which is projected toward the second side of the main body around the mounting groove of the cradle.

6. portable keyboard of claim 5, wherein the inner side of the mounting groove is wider than an entrance of the mounting groove in the hinge direction.

7. The portable keyboard of claim 1, wherein the key assembly comprises a bottom frame on which the flexible connection member and a plurality of the key tops are seated and a top frame at which an opening corresponding to the key top is formed and the top frame combined with the bottom frame.

8. The portable keyboard of claim 7, further comprising:
a first magnet arranged between the top frame and the bottom frame; and
a second magnet or a metallic part combined by magnetic power of the first magnet installed in the main body, wherein the plurality of the key assemblies are fixed in a state of being rolled around the main body due to the magnetic power of the first magnet.

9. The portable keyboard of claim 1, further comprising an open tab projected from a key assembly farthest from the main body among the plurality of key assemblies.

10. The portable keyboard of claim 9, wherein the open tab is made of a flexible material.

* * * * *